United States Patent
Kim et al.

(10) Patent No.: US 6,700,857 B1
(45) Date of Patent: Mar. 2, 2004

(54) METHOD AND APPARATUS FOR CONTROLLING LIGHT POWER OF OPTICAL DISK SYSTEM, AND OPTICAL DISK SYSTEM HAVING THE SAME

(75) Inventors: Je-kook Kim, Yongin (KR); Young-wook Jang, Yongin (KR); Bom-yun Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 362 days.

(21) Appl. No.: 09/704,987

(22) Filed: Nov. 2, 2000

(30) Foreign Application Priority Data

Nov. 3, 1999 (KR) .......................... 1999-48394
Oct. 26, 2000 (KR) .......................... 2000-63178

(51) Int. Cl.$^7$ ................................ G11B 7/00
(52) U.S. Cl. ................. 369/116; 369/44.31
(58) Field of Search ..................... 369/116, 47.51, 369/47.52, 47.53, 53.26, 53.27, 44.31, 106, 59.11

(56) References Cited

U.S. PATENT DOCUMENTS

| | | | |
|---|---|---|---|
| 5,005,164 A | * 4/1991 | Sakamoto et al. | 369/116 |
| 5,548,573 A | * 8/1996 | Takeuchi | 369/116 |
| 5,726,961 A | * 3/1998 | Yanagawa | 369/116 |
| 5,798,992 A | * 8/1998 | Kaneko et al. | 369/116 |
| 6,246,660 B1 | * 6/2001 | Yanagawa | 369/116 |

FOREIGN PATENT DOCUMENTS

KR    P1999-0041934    6/1999

* cited by examiner

*Primary Examiner*—Thang V. Tran
(74) *Attorney, Agent, or Firm*—Mills & Onello LLP

(57) ABSTRACT

Method and apparatus for controlling the light power of an optical disk system, and optical disk system having the same are provided. The optical disk system includes a microcontroller for controlling the operation of the optical disk system, a light power adjusting apparatus for generating a light quantity control signal for controlling the quantity of light emitted from the optical disk, and an optical pickup device for adjusting the quantity of light emitted from the optical disk in response to the light quantity control signal. The method includes the steps of converting E and F beam signals used for generating a tracking error signal into the form of voltage and synthesizing the converted E and F beam signals to obtain a tracking sum signal; maintaining the light power of the light emitting diode when the level of the tracking sum signal is the same as that of a reference signal; decreasing the light power of the light emitting diode, corresponding to the difference between the tracking sum signal and the reference signal, when the level of the travel sum signal is higher than that of the reference signal; and increasing the light power of the light emitting diode, corresponding to the difference between the tracking sum signal and the reference signal, when the level of the travel sum signal is lower than that of the reference signal. The progress of the method returns back to the stop of obtaining a tracking sum signal after increasing or decreasing the light power. Accordingly, the quantity of light reflected from the an optical disk can be constantly maintained.

13 Claims, 7 Drawing Sheets

METHOD AND APPARATUS FOR CONTROLLING LIGHT POWER OF OPTICAL DISK SYSTEM, AND OPTICAL DISK SYSTEM HAVING THE SAME

BACKGROUND OF THE INVENTION

1. Field of the Invention

The present invention relates to an optical disk system, and more particularly, to method and apparatus for controlling the light power of an optical disk system by controlling the quantity of light of an optical pick-up device of the optical disk system.

2. Description of the Related Art

Optical disk systems record a large amount of information on a disk using light. While binary information is recorded on a general magnetic disk using the magnetization direction of a magnetic body, binary information is recorded on an optical disk through the arrangement of the absence and existence of grooves which are made on the surface of the disk using precision light such as laser beams.

An optical pickup device is provided for picking up information from an optical record medium such as a compact disk read only memory (CD-ROM). Such an optical pickup device includes a unit for irradiating a linear laser beam on a disk, an optical unit for dividing a laser beam reflected and returned from the disk in directions orthogonal to each other and a photodetector for receiving an optical beam. A light emitting diode (or a laser diode) is usually used as the unit for irradiating light on a disk.

An optical pickup device having such configuration as described above is controlled by a microcontroller. When data stored in an optical record medium is intended to be read, the microcontroller controls power to be supplied to an optical pickup device, and the optical pickup device supplied with the power starts operation. When the reading operation is completed, the microcontroller breaks the power supplied to the optical pickup device to stop the operation of the optical pickup device.

However, when power is suddenly supplied to the optical pickup device, the optical pickup device can be damaged due to inflow of surge voltage or overcurrent. To prevent such damage, it is necessary to provide a surge protector or an overcurrent protection circuit in an optical disk system. However, when the optical disk system is provided with the surge protector or the overcurrent protection circuit, the area of a circuit increases, and the manufacturing cost increases.

Meanwhile, to adjust the reflectivity of an optical disk and the deviation of an integrated circuit, tracking, focus or radio frequency (RF) signals are applied to an automatic gain circuit. However, since the light reflectivity of disks such as CD-ROMs, CD-RW disks derived from compact disks is very low at 30–90% of that of the compact disks, a problem may occur in automatic gain adjustment, and data cannot be read from a disk depending on the type of the disk.

A conventional light power adjusting apparatus can automatically adjust the power of a light emitting diode to be constant but cannot adjust the quantity of light of the light emitting diode depending on the quantity of light reflected from an optical disk. In particular, since a main beam repeatedly passes pits and mirrors, the level of a RF signal waves so that the peak level of the RF signal cannot be stably detected, and the level of the RF signal can be changed during tracking search. In this situation, a conventional light power adjusting apparatus can only detect the quantity of light emitted from a light emitting diode but cannot control the reflectivity of the light emitting diode, so that the conventional light power adjusting apparatus cannot realize the constant light reflectivity of the light emitting diode.

SUMMARY OF THE INVENTION

To solve the above problems, it is a first object of the present invention to provide an optical disk system capable of constantly adjusting the quantity of received light by receiving light reflected from an optical disk and using the received light for controlling the quantity of light emitted from an optical pickup device.

It is a second object of the present invention to provide an optical disk system having an optical pickup device which stably operates without being influenced by overcurrent when power starts to be supplied.

It is a third object of the present invention to provide a method of adjusting the light power of an optical disk system which is capable of constantly maintaining light reflectivity (or the quantity of received light) by controlling the power of a light emitting diode using signals used for generating a tracking error signal in the optical disk system.

It is a fourth object of the present invention to provide an apparatus for adjusting the light power, which performs the light power adjustment method in the optical disk system.

Accordingly, to achieve the first object of the invention, there is provided an optical disk system for reproducing information stored on an optical disk. The optical disk system includes a microcontroller for generating a plurality of control signals for controlling the operation of the optical disk system; a light power adjusting apparatus for generating a light quantity control signal for controlling the quantity of light emitted to the optical disk using light quantity information related to the quantity of light reflected from the optical disk, in response to at least one of the plurality of control signals output from the microcontroller; and an optical pickup device for adjusting the quantity of light emitted from the optical disk in response to the light quantity control signal, receiving light reflected from the optical disk, and generating the light quantity information.

To achieve the second object of the invention, there is provided an optical disk system for reproducing information stored on an optical disk. The optical disk system includes a microcontroller for controlling the operation of the optical disk system and generating an ON/OFF control signal; a light power adjusting apparatus for generating a light quantity control signal, for adjusting, i.e., increasing or decreasing, the quantity of light emitted from the optical disk in stages, in response to the ON/OFF control signal; and an optical pickup device for emitting light of a certain quantity corresponding to the light quantity control signal and detecting a signal from the optical disk.

To achieve the third object of the invention, there is provided a light power adjusting method which is performed by a light power adjusting apparatus of an optical disk system having a light emitting diode for irradiating light on an optical disk. The light power adjusting method includes the steps of (a) converting E and F beam signals used for generating a tracking error signal into E and F beam voltage signals; (b) synthesizing the E and F beam voltage signals to obtain a tracking sum signal; (c) determining whether the level of the tracking sum signal is the same as that of a reference signal; (d) determining whether the level of the tracking sum signal is higher than that of the reference signal, when the level of the tracking sum signal is not the same as that of the reference signal; (e) decreasing the light power of the light emitting diode, corresponding to the difference between the tracking sum signal and the reference signal, and steps (a) through (d) when the level of the tracking sum signal is higher than that of the reference signal; (f) increasing the light power of the light emitting diode, corresponding to the difference between the tracking sum signal and the reference signal, and steps (a) through (d) when the level of the tracking sum signal is lower than that of the reference signal; and (g) maintaining the light power of the light emitting diode when the level of the tracking sum signal is the same as that of the reference signal.

To achieve the fourth object of the invention, there is provided a light power adjusting apparatus included in an optical disk system having a light emitting diode for irradiating light on an optical disk and a light receiving diode for receiving light reflected from the optical disk. The light power adjusting apparatus includes a signal converter for converting E and F beam signals used for generating a tracking error signal into E and F beam voltage signals; a signal synthesizer for synthesizing the E and F beam voltage signals and outputting the synthesized result as a tracking sum signal; a current difference detector for outputting a difference current signal corresponding to the difference between the tracking sum signal and a reference signal; and a current-to-voltage converter for converting the difference current signal into a control voltage. The power of the light emitting diode is adjusted in response to a signal corresponding to the quantity of light received by the light receiving diode and the control voltage.

BRIEF DESCRIPTION OF THE DRAWINGS

The above objectives and advantages of the present invention will become more apparent by describing in detail preferred embodiments thereof with reference to the attached drawings in which.

DETAILED DESCRIPTION OF THE PRESENT INVENTION

Figure 1:
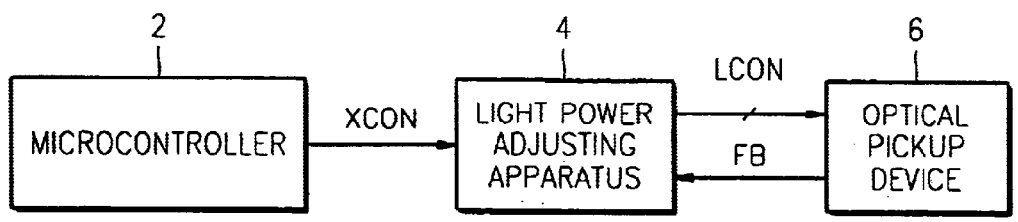
FIG. 1 is a schematic block diagram illustrating an optical disk system according to the present invention.

Hereinafter, the present invention will be described in detail by explaining preferred embodiments of the present invention with reference to the attached drawings. To facilitate the description in this specification, signals acting the same role are given the same reference characters in the drawings.

Referring to FIG. 1, an optical disk system according to the present invention includes a microcontroller 2, a light power adjusting apparatus 4 and an optical pickup device 6.

The microcontroller 2 controls the entire optical disk system and generates a variety of control signals needed by the light power adjusting apparatus 4 and the optical pickup device 6.

The light power adjusting apparatus 4 generates a light quantity control signal LCON for adjusting the quantity of light generated by an optical irradiating unit (e.g., a light emitting diode) of the optical pickup device 6 under the control of the microcontroller 2. The light power adjusting apparatus 4 can adjust the quantity of light in digital or analog form. In other words, the light quantity control signal LCON may be a digital signal or an analog signal.

The optical pickup device 6 emits light in a certain quantity corresponding to the light quantity control signal LCON to an optical disk (not shown) to read data from the optical disk. The optical pickup device 6 uses light reflected from the optical disk when reading the data. The quantity of light reflected from the optical disk varies with the type of optical disk.

Accordingly, it is preferable that the optical pickup device 6 outputs light quantity information FB on the quantity of light reflected from the optical disk, and the light power adjusting apparatus 4 performs light power adjustment using the light quantity information FB.

Figure 2:
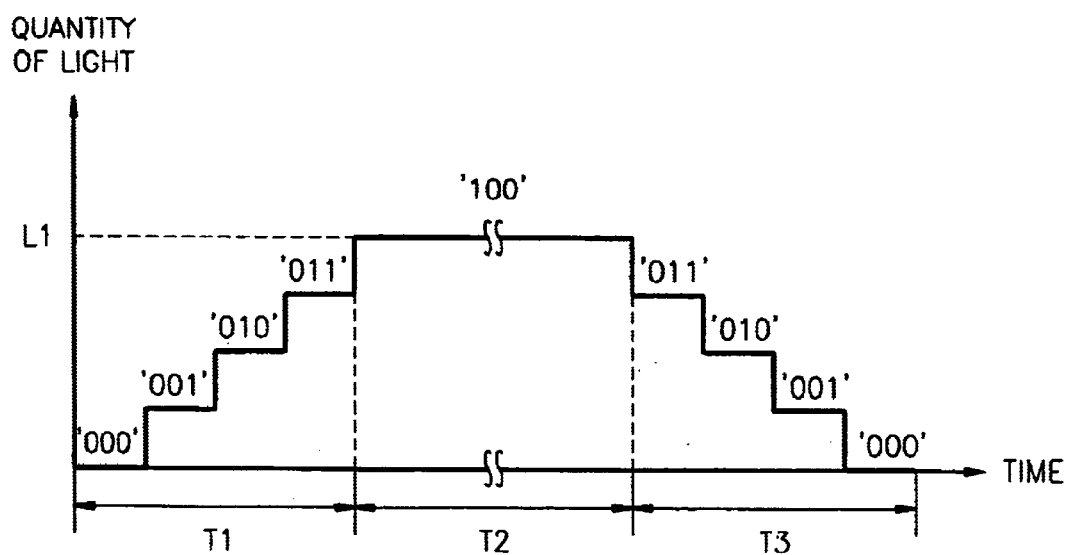
FIG. 2 is a diagram illustrating an example in which the quantity of light generated by the optical pickup device of the optical disk system of FIG. 1 is adjusted by stages.

FIG. 2 is a diagram illustrating an example in which the quantity of light generated by the optical pickup device 6 of the optical disk system of FIG. 1 is adjusted by stages. FIG. 2 illustrates an example in which the quantity of light is adjusted throughout the procedure from a step where the optical disk system starts operation in response to the application of power to a stop of terminating the operation.

In FIG. 1, the microcontroller 2 generates an ON/OFF control signal for starting or stopping the operation of the optical pickup device 6. The ON/OFF control signal is a sort of control signal XCON generated by the microcontroller 2 for controlling the light power adjusting apparatus 4.

When intending to start an operation of reading data from an optical disk such as a DVD, CD-ROM, mini-disk, CD-RAM or CD-RW, the microcontroller 2 generates the ON/OFF control signal as a first level (e.g., a high level). When intending to stop the reading operation, the microcontroller 2 generates the ON/OFF control signal as a second level (e.g., a low level).

The light power adjusting apparatus 4 outputs the light quantity control signal LCON for controlling tho quantity of light generated by the optical pickup device 6 in response to the ON/OFF control signal received from the microcontroller 2. The light quantity control signal LCON is, for example, a 3-bit signal. When the ON/OFF control signal received from the microcontroller 2 is the first level, the light power adjusting apparatus 4 generates the light quantity control signal LCON such that the optical pickup device 6 can increase the quantity of light by stages. When the ON/OFF control signal received from the microcontroller 2 is the second level, the light power adjusting apparatus 4 generates the light quantity control signal LCON such that the optical pickup device 6 can decrease the quantity of light by stages. The light power adjusting apparatus 4 can be provided in a radio frequency (RF) circuit, a digital signal processor (DSP) or a digital servo, which is provided in the optical disk system.

Referring to FIG. 2, when the optical control signal LCON output from the light power adjusting apparatus 4 is a binary number '000', the optical pickup device 6 does not operate (that is, the optical pickup device 6 does not emit light). When the microcontroller 2 outputs the ON/OFF control signal as the first level to read data from the optical disk, the light power adjusting apparatus 4 sequentially outputs a series of light quantity control signals LCON during an interval T1. For example, the light quantity control signal LCON sequentially changes into '001', '010', '011' and '100'. The optical pickup device 6 emits light of a certain quantity corresponding to the light quantity control signal LCON provided by the light power adjusting apparatus 4. In other words, the quantity of light increases by stages as time goes by, as shown in FIG. 2. In this example, the quantity of light, L1, corresponding to the light quantity control signal LCON, '100', is suitable for reading data from the optical disk. In FIG. 2, an interval T2 denotes time taken to read data from the optical disk.

Once reading data from the optical disk is completed, the microcontroller 2 outputs the ON/OFF control signal as the second level, the light power adjusting apparatus 4 sequentially outputs a series of light quantity control signals LCON during an interval T3 in response to the second level of the ON/OFF control signal. For example, the light quantity control signal LCON sequentially changes into '011', '010', '001' and '000'. Accordingly, as shown in FIG. 2, the quantity of light decreases by stages as time goes by.

In this example, the optical pickup device 6 adjusts the quantity of light by adjusting the amount of current supplied from a power source by stages in response to the light quantity control signal LCON received from the light power adjusting apparatus 4. Accordingly, current flowing into the optical pickup device 6 increases by stages when power starts to be supplied so that an overcurrent protection circuit is not needed. When the power supply malfunctions, the current flowing into the optical pickup device 6 decreases by stages so that the life of the optical pickup device 6 can be extended.

Generally, the quantity of light reflected from an optical record medium when the light is emitted from the optical pickup device 6 varies with the type of the optical record medium, that is, depending on which optical disk is used among a DVD, CD-ROM, mini-disk, CD-RAM or a CD-RW. Therefore, the level of the quantity of light L1 generated by the optical pickup device 6 during reading operation should be set differently depending on the type of optical record medium.

The optical pickup device 6 includes a photodetector (not shown) for receiving light reflected from an optical record medium and detecting the quantity of reflected light. The light quantity information FB detected by the photodetector is fed back to the light power adjusting apparatus 4. The light power adjusting apparatus 4 adjusts the light quantity control signal LCON in response to the light quantity information FB fed back from the optical pickup device 6 and outputs an adjusted light quantity control signal LCON.

Method and apparatus for adjusting the light power of a light emitting unit (for example, a light emitting diode) of an optical pickup device using the quantity of light reflected and fed back from an optical disk to adjust the quantity of light reflected from the optical disk will be described in detail with reference to FIGS. 3 through 9.

Figure 3:
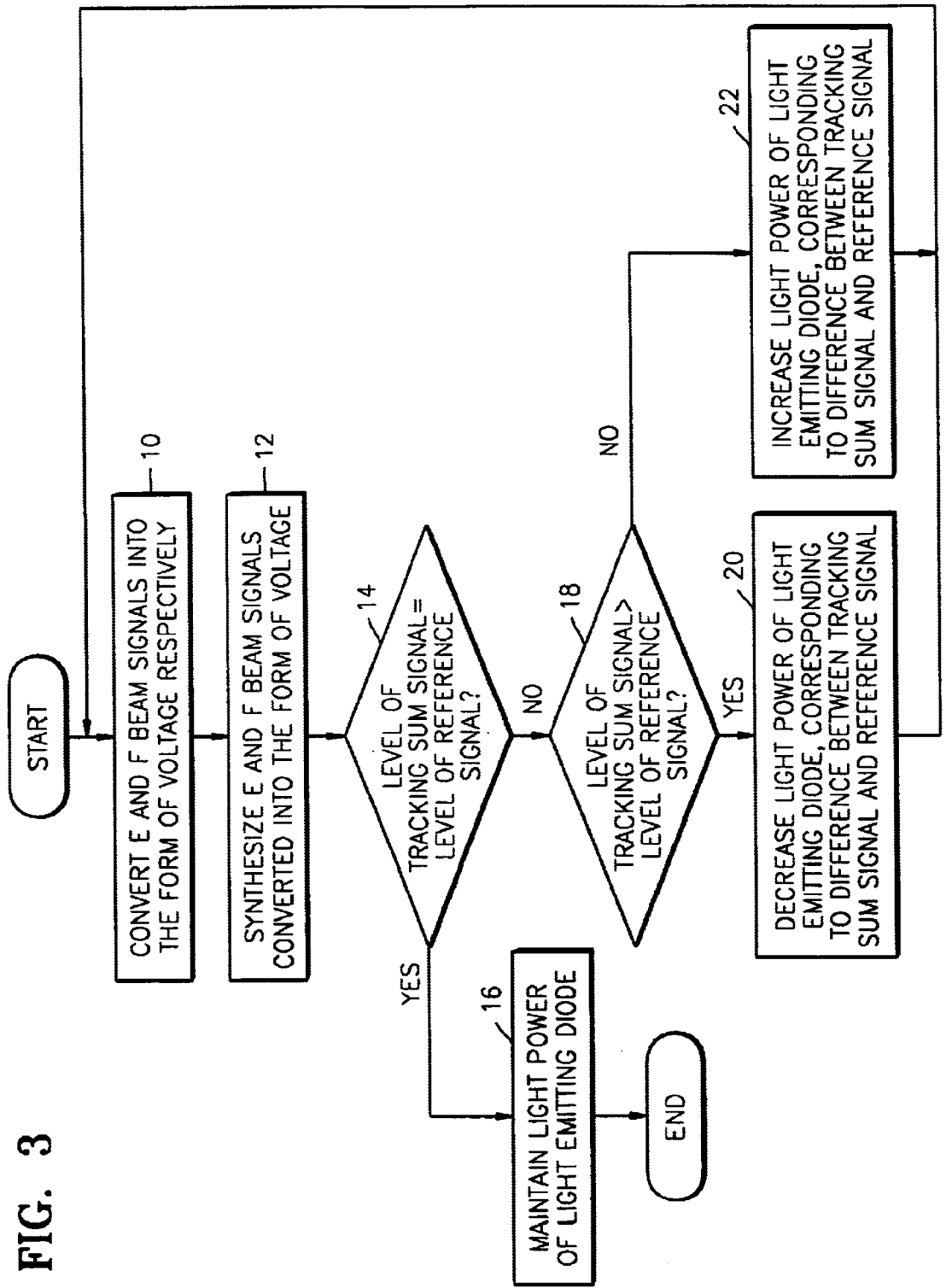
FIG. 3 is a flowchart illustrating a method of adjusting light power according to an embodiment of the present invention.

FIG. 3 is a flowchart illustrating a method of adjusting light power according to an embodiment of the present invention. The method of this embodiment compares a signal obtained by synthesizing E and F beam signals with a reference signal and controls the light power of a light emitting diode.

Figure 4:
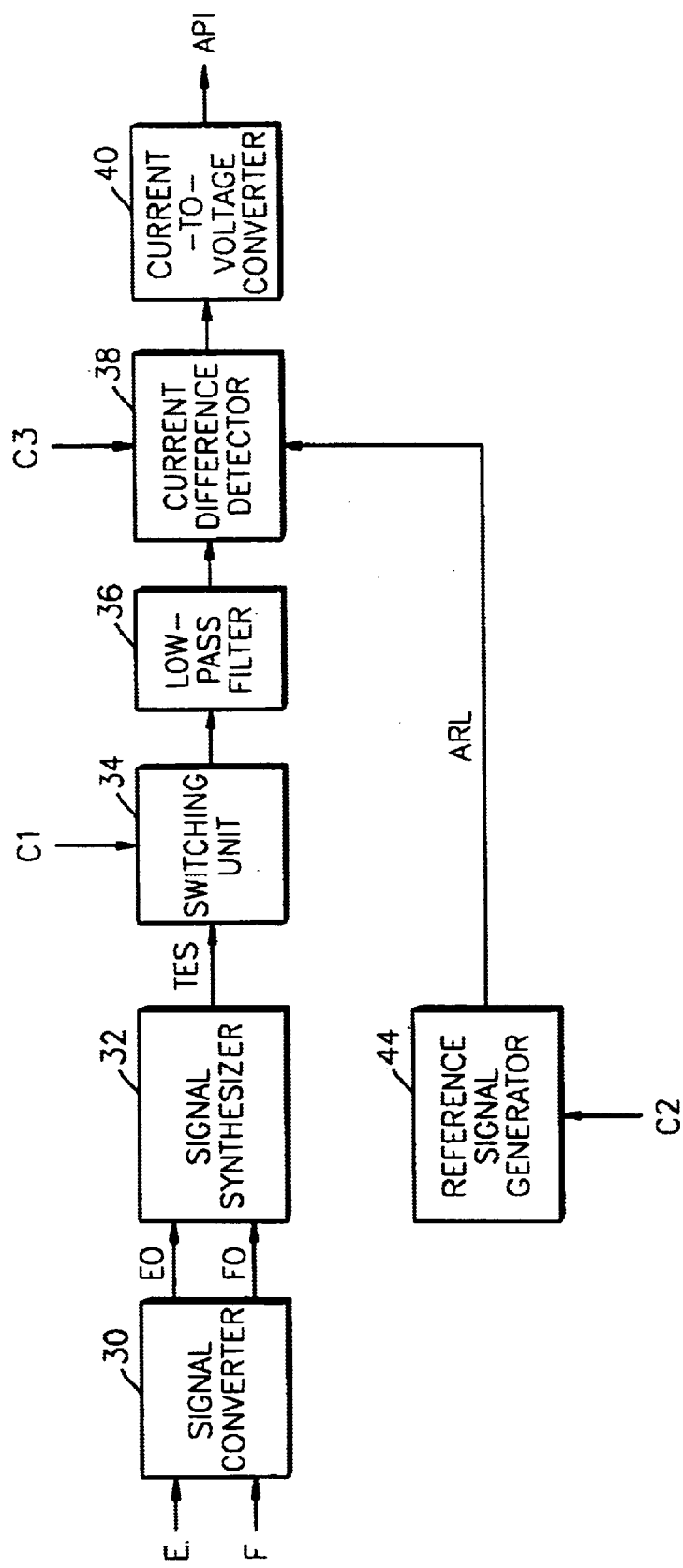
FIG. 4 is a block diagram illustrating a light power adjusting apparatus according to an embodiment of the present invention, the apparatus performing the method of FIG. 3.

FIG. 4 is a schematic block diagram illustrating a light power adjusting apparatus according to an embodiment of the present invention, the apparatus performing the method of FIG. 3. The light power adjusting apparatus includes a signal converter 30, a signal synthesizer 32, a current difference detector 38 and a current-to-voltage converter 40. Here, the light power adjusting apparatus of FIG. 4 may selectively include a switching unit 34, a low-pass filter 36 and a reference signal generator 44 as will be described later.

Generally, an optical disk system includes a light emitting diode (or a laser diode) emitting light to an optical disk and a light receiving diode for receiving light reflected from the optical disk. The light emitting and receiving diodes are included in the optical pickup device 6 of FIG. 1.

In step 10, the signal converter 30 of FIG. 4 converts E and F beam signals used for generating a tracking error signal into voltages, respectively, and outputs the converted E and F beam signals E0 and F0 to the signal synthesizer 32.

Figure 5:
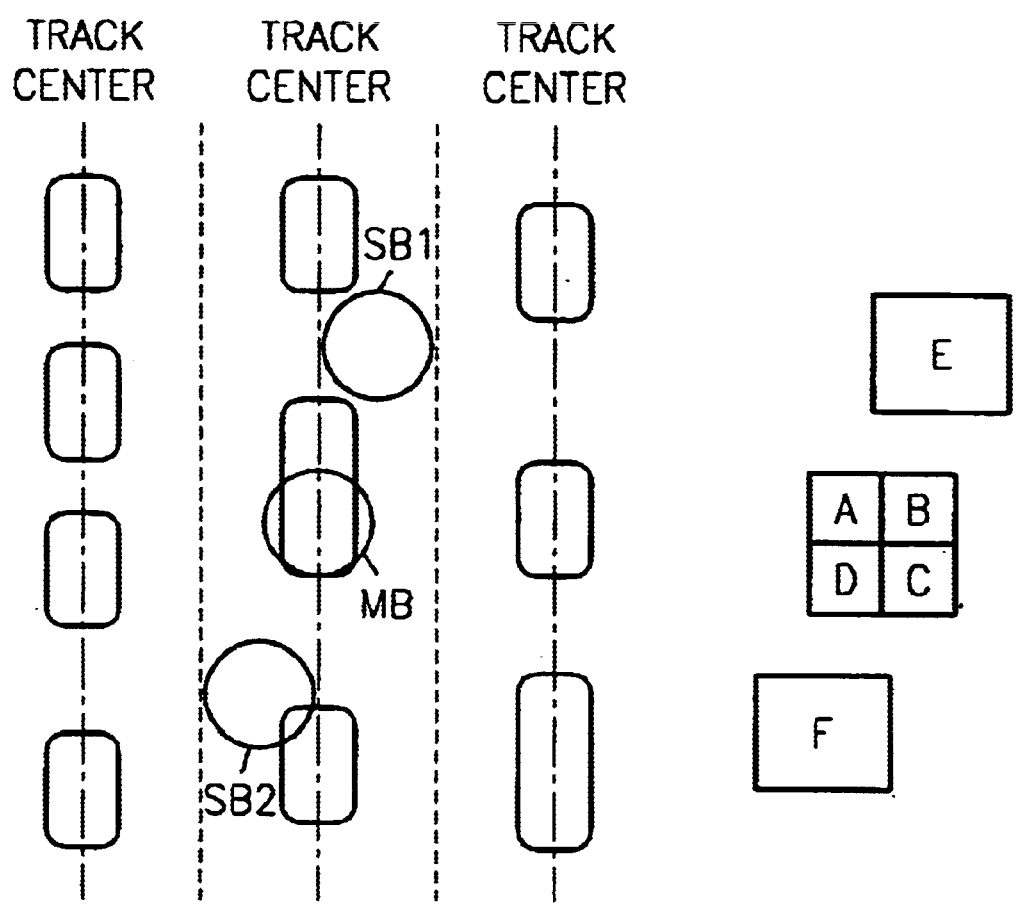
FIG. 5 is a diagram illustrating a signal detection method of the optical pickup device of FIG. 1.

Here, the E and F beam signals can be generated in two types according to a beam method of an optical disk system. The E and F beam signals will be described in detail with reference to FIG. 5. FIG. 5 is a diagram illustrating a signal detection method of the optical pickup device of FIG. 1.

An optical disk has a plurality of tracks on which pits forms a queue. To reproduce data stored in the optical disk, an optical pickup device emits a light beam along a track center and detects a signal using a beam reflected and received from the optical disk. Generally, 1 beam or 3 beams are used.

FIG. 5 shows the case where an optical disk system uses a 3-beam method. Three beams are composed of a main beam MB and two side beams SB1 and SB2. Beams reflected from an optical disk are received by a plurality of receiving diodes. Reference characters A through F in FIG. 5 denote receiving diodes. Signals detected by the receiving diodes are A through F beam signals. The A through D beam signals are output from the main beam MB, and the E and F beam signals are output from the side beams SB1 and SB2, respectively.

When the optical disk system uses a 1-beam method, the E beam signal is generated by synthesizing the B and C beam signals output from one main beam, and the F beam signal is generated by synthesizing the A and D beam signals output from the one main beam.

Referring back to FIGS. 3 and 4, in step 12, the signal synthesizer 32 synthesizes the E and F beam signals E0 and F0 converted into voltages output from the signal converter 30 and outputs the synthesized result as a tracking sum signal TES to the current difference detector 38, after the step 10. Alternatively, the tracking sum signal TES may be input to the current difference detector 38 through the switching unit 34 and the low-pass filter 36 shown in FIG. 4.

In step 14, it is determined whether the level of the tracking sum signal TES is the same as that of a reference signal ARL, after the step 12. Here, the level of the reference signal ARL may be a value fixed for the desired quantity of reflected light or may vary to vary the quantity of reflected light. When the level of the tracking sum signal TES is the same as that of the reference signal ARL, the light power of a light emitting diode is maintained in step 16 because the quantity of light reflected from an optical disk is constant.

However, when the level of the tracking sum signal TES is not the same as that of the reference signal ARL, it is determined whether the level of the tracking sum signal TES is higher than that of the reference signal ARL in step 18. As shown in step 20, when the level of the tracking sum signal TES is higher than that of the reference signal ARL, the quantity of light reflected from the optical disk is larger than desired, so the light power of the light emitting diode is decreased, corresponding to the difference between the tracking sum signal TES and the reference signal ARL, and the progress goes back to the step 10. On the other hand, as shown in step 22, when the level of the tracking sum signal TES is lower than that of the reference signal ARL, the quantity of light reflected from the optical disk is smaller than desired, so the light power of the light emitting diode is increased, corresponding to the difference between the tracking sum signal TES and the reference signal ARL, and the progress goes back to the step 10. The progress goes back to the step 10 in the steps 20 and 22 to re-investigate the decreased or increased quantity of light reflected from the optical disk due to a decrease or increase in the light power of the light emitting diode.

The steps 14 through 22 are performed by the current difference detector 38 and the current-to-voltage converter 40 shown in FIG. 4. The current difference detector 38 outputs the difference component between the tracking sum signal TES and the reference signal ARL as a difference current signal in the form of current to the current-to-voltage converter 40. Here, the difference component in the form of voltage is converted into a current form because it is easier to control the amount of current than the amount of voltage. Here, the current difference detector 38 can control the amount of current of the difference current signal in response to a control signal C3. The current difference detector 38 can also detect a digitalized difference component. For this, the current difference detector 38 may be provided with an analog-to-digital converter (not shown) for converting the tracking sum signal TES into a digital signal and a digital-to-analog converter (not shown) for converting the digital difference current signal into an analog signal at the input and output sides, respectively. Accordingly, the current difference detector 38 detects the digital difference component between the digital tracking sum signal and the digital reference signal, converts the digital difference component into an analog form, and outputs the analog difference component to the current-to-voltage converter 40, so that the current difference detector 38 can detect the difference component more precisely.

The light power adjusting apparatus of FIG. 4 may further include the low-pass filter 36 for low-pass filtering the tracking sum signal TES output from the signal synthesizer 32 and outputting the result of the low-pass filtering to the current difference detector 38. Here, the current difference detector 38 outputs the difference component between a tracking sum signal, which has been low-pass filtered by the low-pass filter 36, instead of the tracking sum signal TES, and the reference signal ARL in the form of current to the current-to-voltage converter 40. In other words, the low-pass filter 36 removes ripples from the tracking sum signal TES output from the signal synthesizer 32 or removes a rapid change in the level of the tracking sum signal TES. Unlike the configuration shown in FIG. 4, a light power adjusting apparatus according to the present invention may be provided with a half or full wave rectifier (not shown) or a peak detector (not shown), instead of the low-pass filter 36. Here, the rectifier replacing the low-pass filter 36 half or full wave rectifies the tracking sum signal TES and outputs the rectified result to the current difference detector 38. Alternatively, the peak detector replacing the low-pass filter 36 detects the peak of the tracking sum signal TES and outputs the detected result to the current difference detector 38.

The light power adjusting apparatus of FIG. 4 may further include the switching unit 34 for controlling the tracking sum signal TES output from the signal synthesizer 32 not to be input to the low-pass filter 36 in response to the first control signal C1. During an operation such as a tracking jumping operation or a tracking searching operation in which the quantity of light reflected and received from the optical disk greatly varies, the levels of the E and F beam signals also greatly vary so that the quantity of reflected light cannot be precisely adjusted. Accordingly, the microcontroller 2 of FIG. 1 generates the first control signal C1 to control the switching unit 34 not to apply the tracking sum signal TES output from the signal synthesizer 32 to the low-pass filter 36. Here, the low-pass filter 36 holds a difference current signal which has been previously output to the current difference detector 38 and outputs the previous difference current signal to the current difference detector 38 when the tracking sum signal TES is not input from the switching unit 34.

In addition, the light power adjusting apparatus of FIG. 4 may further include the reference signal generator 44 for adjusting the level of the reference signal ARL in response to a second control signal C2 and outputting the reference signal ARL having the adjusted level to the current difference detector 38. Here, the second control signal C2 can be generated by the microcontroller 2 of FIG. 1.

The current-to-voltage converter 40 of FIG. 4 converts the difference current signal output from the current difference detector 38 in the form of current into a control voltage API. The control voltage API is used for adjusting the light power of the light emitting diode in the step 16, 20 or 22 together with a signal corresponding to the quantity of light received by the receiving diodes.

Figure 6:
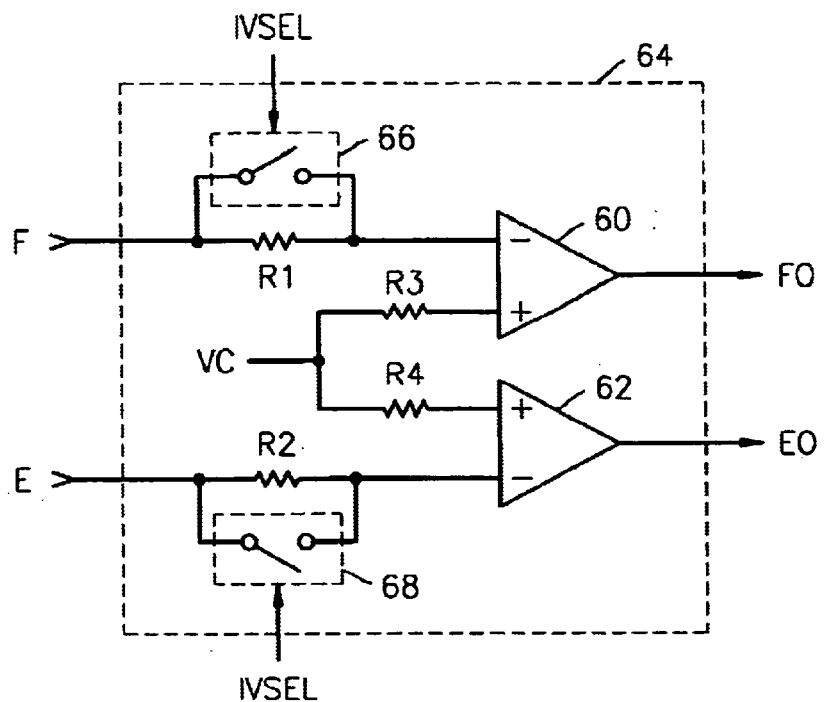
FIG. 6 is a circuit diagram illustrating a preferred embodiment of the signal converter of FIG. 4.

FIG. 6 is a circuit diagram illustrating a preferred embodiment of the signal converter 30 of FIG. 4 A signal converter 64 of FIG. 6 includes resistances R1, R2. R3 and R4, amplifiers 60 and 62 and switches 66 and 68.

The signal converter 64 of FIG. 6 inputs E and F beam signals, which are generated from a 1 beam or side beams in the form of current to generating a tracking error signal, into the negative input ports of the amplifiers 60 and 62, respectively, through the resistances R1 and R2, respectively, and inputs a predetermined voltage VC into the positive input ports of the amplifiers 60 and 62 through the resistances R3 and R4. Accordingly, E and F beam signals E0 and F0 in the form of voltage can be output through the output ports of the amplifiers 60 and 62, respectively. Here, the switches 66 and 68 are turned on or off in response to a signal IVSEL output from the microcontroller 2 of FIG. 1 and short-circuit the corresponding resistances R1 and R2 so that the level of voltage can be adjusted when the E and F beam signals are converted from current into voltage.

Figure 7:
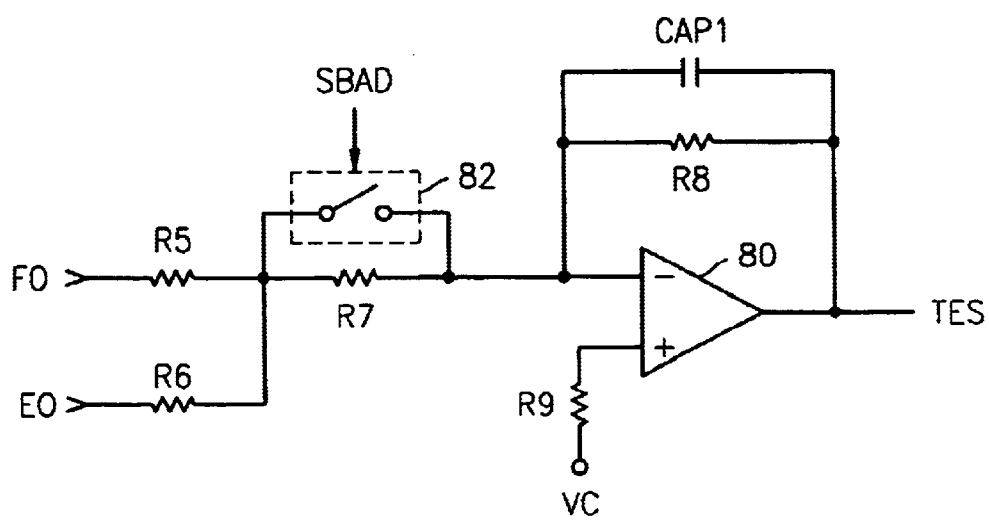
FIG. 7 is a circuit diagram illustrating a preferred embodiment of the signal synthesizer of FIG. 4.

FIG. 7 is a circuit diagram illustrating a preferred embodiment of the signal synthesizer 32 of FIG. 4. The signal synthesizer of FIG. 7 includes resistances R5, R6, R7, R8 and R9, a switch 82, a capacitor CAP1 and an operational amplifier 80.

The signal synthesizer of FIG. 7 performs the same function as the signal synthesizer 32 of FIG. 4. In other words, the signal synthesizer of FIG. 7 synthesizes E and F beam signals E0 and F0 input in the form of voltage through the resistances R5 and R6, respectively, and outputs the synthesized result as a tracking sum signal TFS through the output port of the operational amplifier 80. Here, the switch 82 is turned on or off in response to a signal SBAD output from the microcontroller 2 of FIG. 1 and short-circuits the resistance R7 so that the level of the synthesized result (TES) can be controlled.

Figure 8:
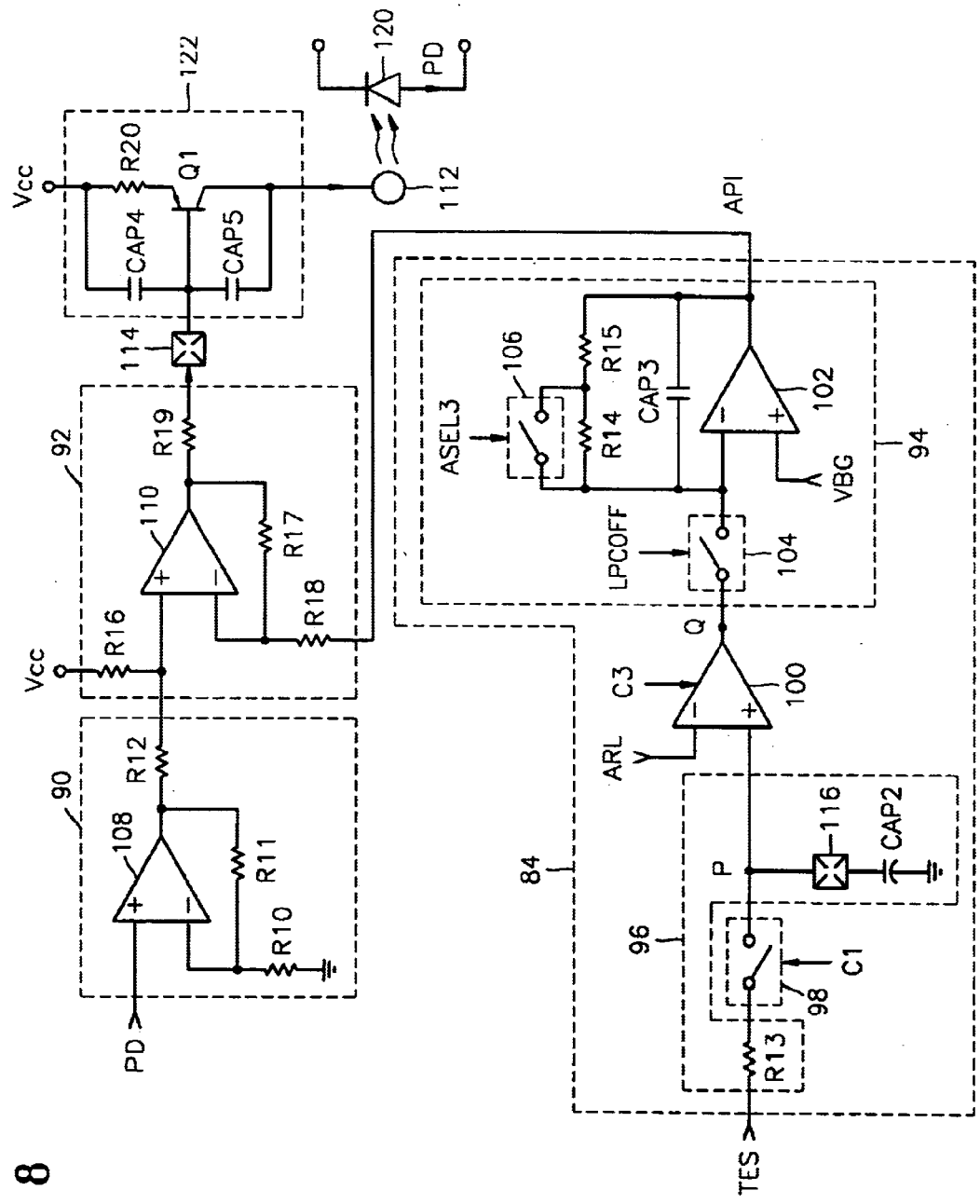
FIG. 8 is a diagram illustrating a preferred embodiment of an optical disk system having the light power adjusting apparatus of FIG. 4.

FIG. 8 is a diagram illustrating a preferred embodiment of an optical disk system having the light power adjusting apparatus of FIG. 4. The optical disk system of FIG. 8 includes a light power adjusting apparatus 84, which includes a switching unit 98, a low-pass filter 96, a power control amplifier 100 and a current-to-voltage converter 94, a non-inverting amplifier 90, an inverting amplifier 92, a light emitting diode driver 122, a light emitting diode 112 and a light receiving diode 120.

The switching unit 98, the low-pass filter 96, the power control amplifier 100 and the current-to-voltage converter 94 of FIG. 8 correspond to the switching unit 34, the low-pass filter 36, the current difference detector 38 and the current-to-voltage converter 40 of FIG. 4, respectively, and they perform the same functions.

The low-pass filter 96 includes a resistance R13 and a capacitor CAP2. The low-pass filter 96 low-pass filters a tracking sum signal TES and outputs the low-pass filtered result to the positive input port of the power control amplifier 100 acting as the current difference detector 38. When the microcontroller 2 of FIG. 1 outputs a first control signal C1 as a logic "high" level in a case where the levels of E and F beam signals vary during tracking search, the switching unit 98 is turned off in response to the logic "high" level of the first control signal C1. Accordingly, the tracking sum signal TES input through the resistance R13 is not input to the power control amplifier 100, and a previous tracking sum signal with which the capacitor CAP2 is charged is provided to the positive input port of the power control amplifier 100. Here, when a light power adjusting apparatus according to the present invention is manifested as an integrated circuit, the capacitor CAP2 is provided outside a pad 116.

The power control amplifier 100 converts a difference component, which is in the form of voltage difference between a reference signal ARL and the low-pass filtered tracking sum signal P, into a difference current signal Q and outputs the difference current signal Q to the current-to-voltage converter 94. The current-to-voltage converter 94 includes resistances R14 and R15, a capacitor CAP3 and an operational amplifier 102 and may be selectively provided with switches 104 and 106. The current-to-voltage converter 94 converts the difference current signal Q output from the power control amplifier 100 into the form of voltage and outputs the converted result as a control voltage API. Here, the switch 106 short-circuits the resistance R14 in response to a signal ASEL3 output from the microcontroller 2 of FIG. 1 so that the gain of the control voltage API can be varied. The current-to-voltage converter 94 may further include the switch 104 for applying the difference current signal Q to the negative input port of the operational amplifier 102 in Response to a signal LPCOFF output from the microcomputer.

An optical signal irradiated by the light emitting diode 112 and reflected from an optical disk (not shown) is converted into an electrical signal PD by the light receiving diode 120. The electrical signal PD is output to the non-inverting amplifier 90. The non-inverting amplifier 90 non-inversely amplifies the signal PD and outputs the non-inversely amplified result to the inverting amplifier 92. For this, the non-inverting amplifier 90 may include resistances R10, R11 and R12 and an operational amplifier 108. The inverting amplifier 92 inversely amplifies the control voltage API and outputs the amplified result as driving current to the light emitting diode driver 122 through a pad 114. For this, the inverting amplifier 92 includes resistances R16, R17, R18 and R19 and an operational amplifier 110. The light emitting diode driver 122 controls the quantity of light of the light emitting diode 112 in response to the driving current output from the inverting amplifier 92. For example, the light emitting diode driver 122 may include a PNP transistor Q1, a resistance R20 and capacitors CAP4 and CAP5 to control the quantity of light of the light emitting diode 112 inversely proportional to the driving current.

The non-inverting amplifier 90 and the inverting amplifier 92 can be replaced with an inverting amplifier and a non-inverting amplifier, respectively, according to the form of circuit devices configured in the light emitting diode driver 122 FIG. 8.

Figure 9:
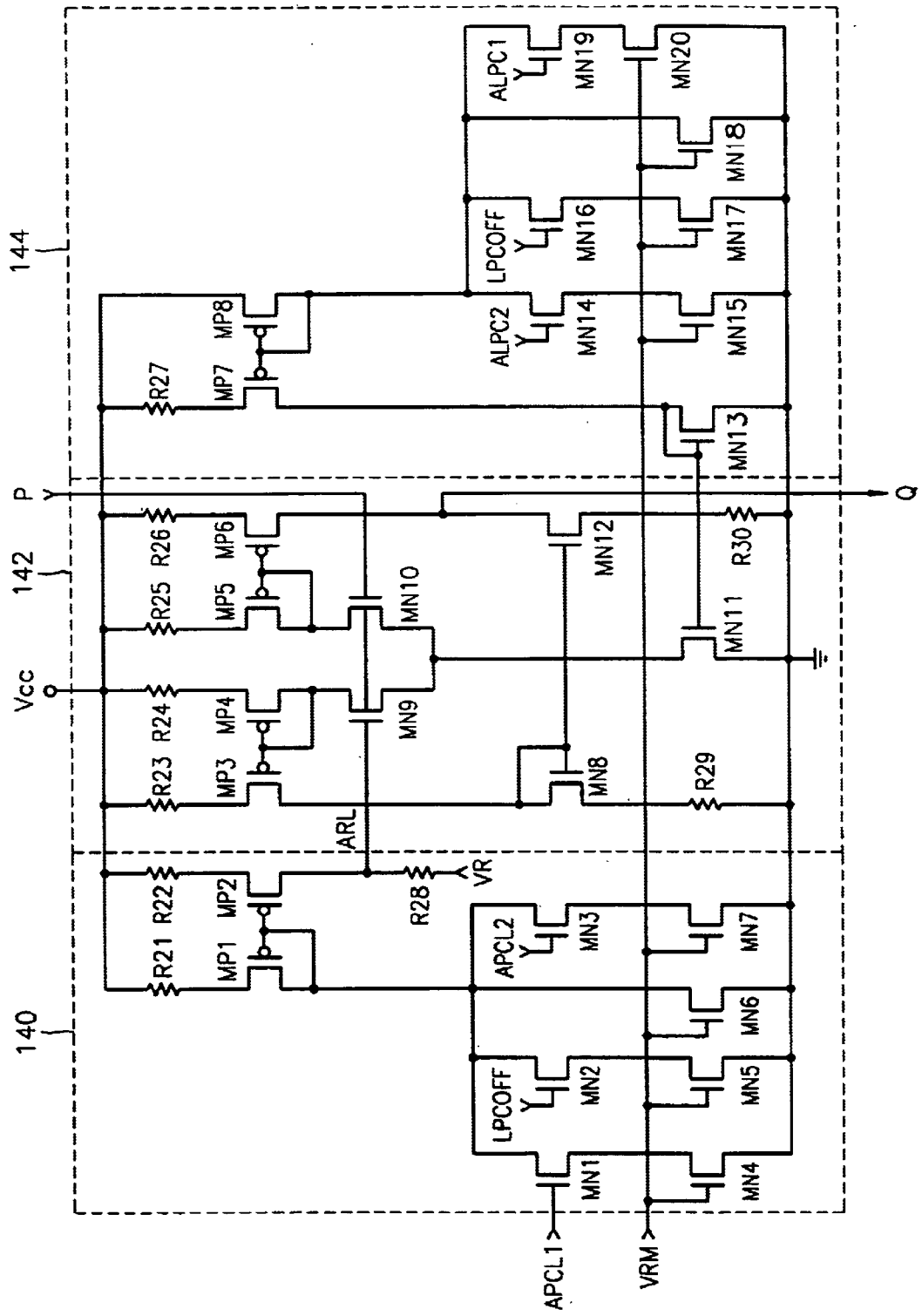
FIG. 9 is a circuit diagram illustrating a preferred embodiment of the reference signal generator and the current difference detector of FIG. 4.

FIG. 9 is a circuit diagram illustrating a preferred embodiment of the reference signal generator 44 of FIG. 4 and the current difference detector 100 of FIG. 8 according to the present invention. The circuit of FIG. 9 includes a reference signal generator 140 and the current difference detector 100 including a signal comparator 142 and a current adjuster 144.

The reference signal generator 140 of FIG. 9 varies the level of a reference signal ARL in response to second control signals APCL1, APCL2 and LPCOFF output from the microcontroller 2 of FIG. 1 and outputs the reference signal ARL having the varied level to the signal comparator 142. For this, the reference signal generator 140 may include NMOS transistors MN1, MN2, MN3, MN4, MN5, MN6 and MN7, PMOS transistors MP1 and MP2 and resistances R21, R22 and R28. Here, "VRM" indicates a bias voltage, and "VR" indicates a voltage having half of the level of a supply voltage Vcc. Current flowing through the resistance R28 is varied by the PMOS transistors MP1 and MP2 realized as current mirrors in response to the second control signals APCL1, LPCOFF and APCL2 so that the level of the reference signal ARL in the form of voltage can be varied.

The signal comparator 142 of FIG. 9 converts a difference component between the voltage of the reference signal output from the reference signal generator 140 and a voltage at the node P of FIG. 8 into a difference current signal Q and outputs the difference current signal Q to the current-to-voltage converter 94 of FIG. 8. For this, the signal comparator 142 may include resistances R23, R24, R26, R26, R20 and R30, PMOS transistors MP3, MP4, MP5 and MP6 and NMOS transistors MN8, MN9, MN10, MN11 and MN12. When a tracking sum signal P is larger than the reference signal ARL, the difference current signal Q becomes a sourcing current output to the current-to-voltage converter 40. On the other hand, when the tracking sum signal P is smaller than the reference signal ARL, the difference current signal Q becomes a sinking current provided from the current-to-voltage converter 40.

Here, to adjust the level of the difference current signal Q, the current adjuster 144 varies the amount of current flowing in the NMOS transistor MN11 in response to third control signals ALPC2 and ALPC1. Here, the microcontroller 2 of FIG. 1 outputs the third control signals ALPC1 and ALPC2 depending on the specifications of an optical pickup device to respond to the output of the light emitting diode 112 which is the feature of the optical pickup device and to be involved with the responding speed of the output of the light emitting diode 112. For this, the current adjustor 144 may include PMOS transistors MP7 and MP8, NMOS transistors MN13, MN14, MN15, MN16, MN17, MN18, MN19 and MN20 and a resistance R27. When the currents of the PMOS transistors MP7 and MP8 realized as current mirrors in the current adjustor 144 are varied in response to the control signals ALPC1 and ALPC2, the currents of the NMOS transistors MN11 and MN13 realized as current mirrors are varied. Accordingly, when the NMOS transistors MN19 and MN14 are turned on in response to the control signals ALPC1 and ALPC2, respectively, the amount of current of the NMOS transistor MN11 increases. When the NMOS transistors MN19 and MN14 are turned off in response to the control signals ALPC1 and ALPC2, respectively, the amount of current of the NMOS transistor MN11 decreases.

Here, since the reference signal ARL is output to a pad (not shown), when the pad is supplied with the supply voltage Vcc through a resistance (not shown) in the outside, the amount of current flowing the resistance R28 increases, so that the optical output of the light emitting diode 112 can be increased. On the other hand, when the pad to which the reference signal ARL is applied is supplied with the predetermined voltage VR through the resistance not shown, the voltage applied to the resistance R28 decreases, so that the optical output of the light emitting diode 112 can be decreased.

A conventional light power adjusting apparatus includes only the inverting amplifier 90, the non-inverting amplifier 92 and the light emitting diode driver 122 of FIG. 8, so that it can only adjust the quantity of light of the light emitting diode 112 to be constant automatically but cannot control the quantity of light of the light emitting diode 122 depending on the quantity of light reflected from an optical disk. However, in a light power adjusting apparatus having the power control amplifier 100 realized as shown in FIG. 9 according to the present invention, when the level a of the tracking sum signal TES is higher than the level of the reference signal ARL, the difference current signal Q becomes a sourcing current input to the current-to-voltage converter 40, so the control voltage API output from the current-to-voltage converter 40 decreases, thereby increasing the driving current output through the pad 114. Accordingly, the voltage Vbe between the base and the emitter of the PNP transistor Q1 is lowered, so that the quantity of light of the light emitting diode 112 decreases. Consequently, the light receiving diode 120 receives a small quantity of light, so the output level of the non-inverting amplifier 90 is lowered, Accordingly, the level of the tracking sum signal TES is lowered. On the other hand, when the level of the tracking sum signal TES is lower than the level of the reference signal ARL, the difference current signal Q becomes a sinking current provided from the current-to-voltage converter 40, so the control voltage API output from the current-to-voltage converter 40 increases, thereby decreasing the driving current output through the pad 114. Accordingly, the voltage Vbe between the base and the emitter of the PNP transistor Q1 is larger, so that the quantity of light of the light emitting diode 112 increases. Consequently, the light receiving diode 120 receives a large quantity of light, so the output level of the non-inverting amplifier 90 is higher. Accordingly, the level of the tracking sum signal TES is higher. Through repeated feedback operations, the level of the tracking sum signal TES is converged into the level of the reference signal ARL, so that the constant light reflectivity can be accomplished.

The control voltage API output from the light power adjusting apparatus of FIG. 4 corresponds to the light quantity control signal LCON of FIG. 1. The E and F beam signals E and F of FIG. 4 correspond to the light quantity information FB fed back from the optical pickup device 6 to the light power adjusting apparatus 4 of FIG. 1.

By adjusting the reference signal ARL generated by the reference signal generator 44 of FIG. 4 by stages in response to the ON/OFF control signal from the microcontroller 2, overcurrent can be prevented from flowing into the optical pickup device 6 when power starts to be supplied to the optical pickup device 6, as described with reference to FIGS. 1 and 2.

Although the invention has been described with reference to particular embodiments, it will be apparent to one of ordinary skill in the art that modifications of the described embodiment may be made without departing from the spirit and scope of the invention. The embodiments of the present invention should be construed in descriptive sense only and not for purposes of limitation. The scope of the invention is set fourth in the following claims.

As described above, an optical disk system according to the present invention receives light reflected from the optical disk and uses it to control the quantity of light emitted from an optical pickup device so that it can control the quantity of received light to be constant. In particular, according to method and apparatus for adjusting light power, the power of a light emitting diode can be is controlled depending on the difference between a signal obtained by synthesizing E and F beam signals used for generating a tracking error signal and a reference signal, so that the light reflectivity of an optical disk system can be constantly maintained, and even the quantity of light of a main beam can be constantly maintained.

In addition, according to an optical disk system of the present invention, the amount of current flowing into an optical pickup device increases by stages when power starts to be supplied thereto so that an overcurrent protection circuit is unnecessary.

What is claimed is:
1. An optical disk system for reproducing information stored on an optical disk, the system comprising:
   a microcontroller for generating a plurality of control signals for controlling the operation of the optical disk system;
   a light power adjusting apparatus for generating a light quantity control signal for controlling the quantity of light emitted to the optical disk using light quantity information related to the quantity of light reflected from the optical disk, in response to at least one of the plurality of control signals output from the microcontroller; and
   an optical pickup device for adjusting the quantity of light emitted from the optical disk in response to the light quantity control signal, receiving light reflected from the optical disk, and generating the light quantity information; wherein:
   the light quantity information comprises E and F beam signals which are used for generating a tracking error signal, and
   the light power adjusting apparatus comprises:
      a signal converter for receiving the E and F beam signals and converting them into voltage signals;
      a signal synthesizer for synthesizing the E and F beam voltage signals output from the signal converter and outputting the synthesized result as a tracking sum signal;
      a current difference detector for outputting a difference current signal corresponding to the difference between the tracking sum signal and a reference signal; and a current-to-voltage converter for converting the difference current signal into a converted voltage signal and outputting the converted voltage signal as the light quantity control signal.

2. A light power adjusting apparatus included in an optical disk system having a light emitting diode for irradiating light on an optical disk and a light receiving diode for receiving light reflected from the optical disk, the light power adjusting apparatus comprising:

a signal converter for converting E and F beam signals used for generating a tracking error signal into E and F beam voltage signals;

a signal synthesizer for synthesizing the E and F beam voltage signals and outputting the synthesized result as a tracking sum signal;

a current difference detector for outputting a difference current signal corresponding to the difference between the tracking sum signal and a reference signal; and a current-to-voltage converter for converting the difference current signal into a control voltage, wherein the power of the light emitting diode is adjusted in response to a signal corresponding to the quantity of light received by the light receiving diode and the control voltage.

3. The light power adjusting apparatus of claim 2, wherein the E beam signal is obtained by synthesizing B and C beam signals, and the F beam signal is obtained by synthesizing A and D beam signals.

4. The light power adjusting apparatus of claim 2, wherein the E and F beam signals are generated from side beams.

5. The light power adjusting apparatus of claim 2, further comprising a low-pass filter for low-pass filtering the tracking sum signal and outputting the low-pass filtered result to the current difference detector, wherein the current difference detector outputs the difference current signal corresponding to the difference between the low-pass filtered result, instead of the tracking sum signal, and the reference signal.

6. The light power adjusting apparatus of claim 5, further comprising a switching means for controlling the input of the tracking sum signal to the low-pass filter in response to a first control signal, wherein the low-pass filter outputs a previous tracking sum signal to the current difference detector when the tracking sum signal is not received from the signal synthesizer.

7. The light power adjusting apparatus of claim 6, wherein the switching means is opened during at least one of tracking jump and tracking search.

8. The light power adjusting apparatus of claim 2, further comprising a rectifier for rectifying the tracking sum signal and outputting the rectified result to the current difference detector, wherein the rectifier outputs the difference current signal corresponding to the difference between the rectified result, instead of the tracking sum signal, and the reference signal.

9. The light power adjusting apparatus of claim 2, further comprising a reference signal generator for adjusting the level of the reference signal in response to a second control signal and outputting the reference signal having the adjusted level into the current difference detector.

10. The light power adjusting apparatus of claim 9, wherein the reference signal generator adjusts the level of the reference signal in stages in response to an ON/OFF control signal input from a microcontroller.

11. The light power adjusting apparatus of claim 2, further comprising a resistance connected between the reference signal and a predetermined voltage.

12. The light power adjusting apparatus of claim 2, wherein the amount of current in the difference current signal is controlled in response to a third control signal.

13. The light power adjusting apparatus of claim 2, wherein the current difference detector comprises:

an analog-to-digital converter for converting the tracking sum signal to a digital signal; and a digital-to-analog converter for converting a digital difference current signal into an analog signal and outputting the analog signal to the current-to-voltage converter, the digital difference current signal corresponding to the difference between the digital tracking sum signal and a digitized version of the reference signal.

* * * * *